J. CRAM.
Churn.

No. 66,681. Patented July 16, 1867.

Witnesses:
W. E. Nlam
James B. Thomas

Inventor:
John Cram

United States Patent Office.

JOHN CRAM, OF CHICAGO, ILLINOIS, ASSIGNOR TO HIMSELF AND JAMES B. THOMAS, OF SAME PLACE.

Letters Patent No. 66,681, dated July 16, 1867.

IMPROVEMENT IN CHURNS.

*The Schedule referred to in these Letters Patent and making part of the same.*

TO ALL WHOM IT MAY CONCERN:

Be it known that I, JOHN CRAM, of Chicago, in the county of Cook, and State of Illinois, have invented a new and useful Improvement in Churns; and I do hereby declare and make known that the following is a full, clear, and exact description of the same, reference being had to the accompanying drawings, and the figures and letters marked thereon, which form part of this specification.

My said invention relates to a churn in which the box containing the cream is suspended upon pivots, and the operation of churning is effected by oscillating or rocking the same in any suitable manner, or by any suitable means; and it consists in a novel arrangement of a spring or springs, so arranged as that each end of the churn, as it descends alternately, strikes upon said spring, and suddenly is checked and thrown back with a jerk, thus breaking up the globules of cream in a very effectual manner, and producing a greater amount of butter from a given quantity of cream and in much less time than can be effected by any of the churns in common use. My said invention further consists in a novel arrangement of cream-cutters or breakers within the churn, so that the said sudden jerking motion, produced as aforesaid, will throw the cream against and through said cutters, thus greatly facilitating and hastening the operation of the churn. My said invention further consists in the novel arrangement of a flutter or gatherer, arranged in the churn so that the said oscillating movement of the churn will gather the butter after it has been produced, and will also operate, if desired, to salt the same uniformly, as hereinafter set forth.

To enable those skilled in the art to understand how to construct and use my invention, I will proceed to describe the same with particularity, making reference in so doing to the aforesaid drawings, in which—

Similar letters of reference in the several figures denote the same parts of my invention.

Figure 1:
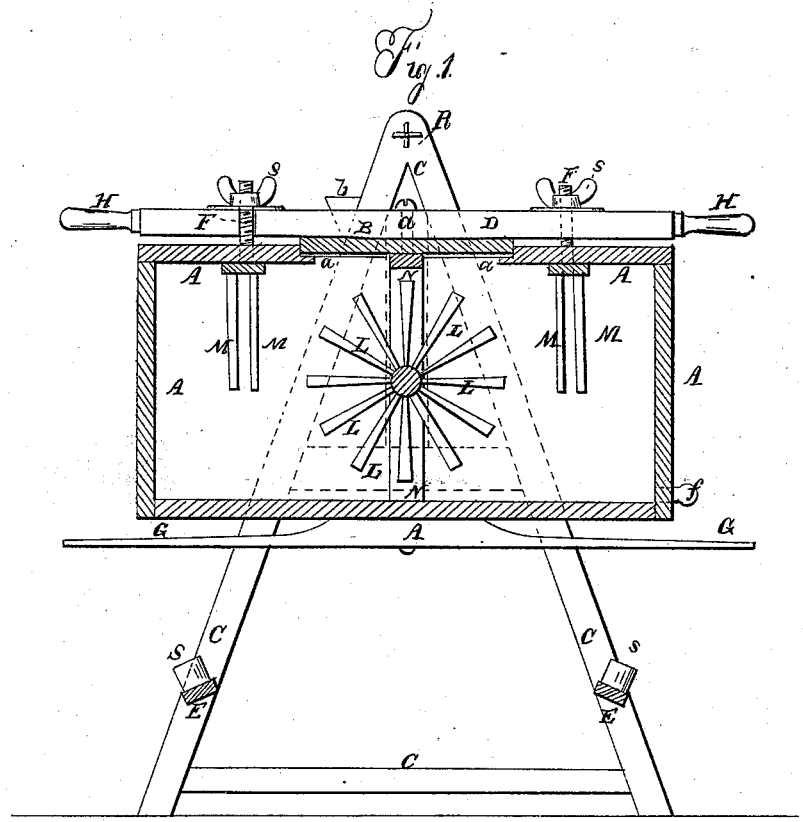
Figure 1 represents a side sectional view of my invention.
Figure 2:
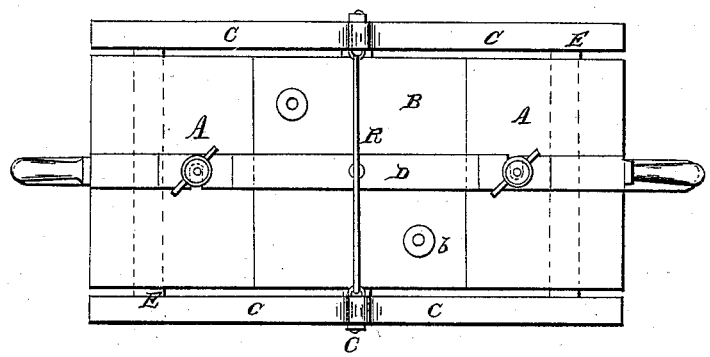
Figure 2 is a plan or top view of the same.

C C represent two V-shaped supports, which, however, may be of any suitable shape, between which are suspended, upon pivots c, a rectangular box, A. The lower ends of said supports C C are connected by the cross-pieces E, and also by a rod, R, at the top, which, however, is detachable at one end, so as to allow the tops to be sprung apart to permit the churn-box A to be dismounted from its supports when desired. When the said rod is fast, however, it and the cross-bars E give the frame C a firm and substantial character sufficient to answer the purposes and uses for which it is employed. At the centre of the top of the churn is an opening, provided with a rubber-lined ledge, a, extending around it, so that the cover B may fit down tight upon the ledge, and prevent the cream from escaping or working through the said joint. The cover B is secured in place by means of a long arm, D, pivoted to said cover at d, so as to turn against the screws F, which project up from the top of the churn, and fit into notches upon the sides of the bar D, so that by turning the thumb-nuts s down upon the bar, the cover is tightened to any required extent. The ends of said bar D are provided with handles H H, one of which the operator may grasp in operating the churn, as hereinafter specified. Upon the bottom of the churn-box is firmly secured a bar, G, so constructed that its ends form a species of spring, as shown in the drawings, which ends alternately strike upon rubber or other suitable springs, marked S, secured to the cross-bars E, or their equivalents, as shown in fig. 1. At one end of the churn is represented a faucet, f, through which the buttermilk may be drawn off when desired. Near each end of the churn there extends down from the top a series of bars, M M, as shown, which may be arranged in a single transverse row, or in double rows, each bar in one row alternating with the spaces between the bars of the other row. These devices, which I call cream-cutters, from their action, hereinafter described, may be made removable, or may be permanently attached to the top g of the churn, as preferred, and should extend down about one-third of the distance from the top to the bottom of the same. At the centre, a similar permanent or removable rake or device, M, may be inserted vertically, extending from top to the bottom; or the spirally arranged dasher-wheel L may be used, either permanently attached or in a removable frame, as preferred, for the objects hereinafter specified.

Having described the construction of my invention, I will describe its operation.

The cream is put into the churn, and the cover B properly secured, the central dasher or gatherer being in the churn or not, as may be preferred. The operator grasps one of the handles H and bears down until the corresponding end of the spring G strikes upon the spring S, giving a sudden check to the downward movement, while the elastic force of the springs throws the churn up and past the centre until the opposite end of the spring G strikes upon the spring S, when the churn is violently checked, and thrown back again, and so on, giving alternate sudden jerking motions to the churn, which has the effect to thoroughly break and cut the cream globules, and rapidly convert it into butter.

It is obvious that the same result in kind would be produced were the springs G alone employed, or if they were unelastic, and the springs S S alone were used. The effect of the aforesaid movements of the churn is to cause the cream to be thrown up from the inclined and lower end of the box in a curved direction through the cream-cutters M, and down upon the gatherer L, if said device be employed during the churning operation; the principal object of the central device L, or its equivalent, herein mentioned, being to gather the butter, and by having the same in as the butter commences to form, and throwing in the salt, the butter is evenly and thoroughly salted, and the buttermilk thoroughly driven from the butter, which is left free from the same when the buttermilk is drained off.

I do not claim the cream-cutters herein described, nor the butter-gatherer, of themselves, but only in the combinations hereinafter specified.

Having described the construction and operation of my invention, I will now specify what I claim, and desire to secure by Letters Patent:

1. I claim the arrangement of springs S S, or their equivalents, in combination with an oscillating churn-box, A, substantially in the manner and for the purposes specified.

2. I claim an oscillating churn-box, A, provided with the springs G G, or their equivalents, in combination with stops, elastic or unelastic, substantially in the manner herein described.

3. I claim the arrangement of the cream-cutters M, in combination with an oscillating churn, when provided with springs G G or elastic stops S S, so as to operate in the manner herein specified.

4. I claim, in combination with an oscillating churn, when provided with springs G G or elastic stops S S, as specified, the arrangement of a butter-gatherer or worker, L, or its equivalent, in the manner and for the purposes described.

5. I claim the combination and arrangement of the oscillating churn A with the cream-cutters M and the butter-gatherer L, substantially as and for the purposes herein specified.

JOHN CRAM.

Witnesses:
 JAMES B. THOMAS,
 L. L. COBURN.